United States Patent
Dunne et al.

(10) Patent No.: US 11,023,663 B2
(45) Date of Patent: Jun. 1, 2021

(54) PERSISTING ANNOTATIONS APPLIED TO AN ELECTRONIC HOSTED WHITEBOARD

(71) Applicant: International Business Machines Corporation, Armonk, NY (US)

(72) Inventors: Jonathan Dunne, Dungarvan (IE); James P. Galvin, Jr., Georgetown, KY (US); Liam Harpur, Skerries (IE); Amy D. Travis, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 618 days.

(21) Appl. No.: 15/067,271

(22) Filed: Mar. 11, 2016

(65) Prior Publication Data

US 2017/0262419 A1     Sep. 14, 2017

(51) Int. Cl.
*G06F 17/00* (2019.01)
*G06F 40/169* (2020.01)
(Continued)

(52) U.S. Cl.
CPC .......... *G06F 40/169* (2020.01); *G06F 3/0481* (2013.01); *G06F 40/42* (2020.01);
(Continued)

(58) Field of Classification Search
CPC .... G06F 17/28; G06F 17/241; G06F 17/2785; G06F 40/169; G06F 40/42; G06F 3/0481;
(Continued)

(56) References Cited

U.S. PATENT DOCUMENTS 6,342,906 B1    1/2002   Kumar et al.
6,862,710 B1    3/2005   Marchisio
(Continued)

FOREIGN PATENT DOCUMENTS

EP    0616448 A2    9/1994

OTHER PUBLICATIONS

Graham Cormode, Vladislav Shkapenyuk, Divesh Srivastava and Bolian Xu, "Forward Decay: A Practical Time Decay Model for Streaming Systems," copyright 2009, 2009 IEEE 25th Inetrnational Conference on Data Engineering (2009), pp. 138-149 (Year: 2009).*

(Continued)

*Primary Examiner* — Andrew T McIntosh
(74) *Attorney, Agent, or Firm* — Cuenot, Forsythe & Kim, LLC (57) ABSTRACT

A plurality of annotations can be received for a presentation presented in a web conference. A respective relevance parameter can be assigned to each of the annotations. Each relevance parameter can indicate a relevance of a respective annotation to a portion of the presentation to which the annotation pertains. For each of the annotations, a decay model based on the respective relevance parameter can be generated. The decay model can indicate different durations of time the annotation is to be visible to different participants participating in the web conference based on respective expertise levels of the participants. Each respective annotation can be presented with the presentation in accordance with the decay model generated for the respective annotation.

12 Claims, 6 Drawing Sheets

(51) Int. Cl.
*H04L 29/06* (2006.01)
*H04L 29/08* (2006.01)
*G06F 40/42* (2020.01)
*G06F 3/0481* (2013.01)

(52) U.S. Cl.
CPC ............ *H04L 65/403* (2013.01); *H04L 67/02*
(2013.01); *H04L 67/306* (2013.01); *H04L 67/42* (2013.01)

(58) Field of Classification Search
CPC . G06T 2219/004; H04L 67/306; H04L 67/42; H04L 65/403; H04L 67/02; H04L 65/1083
See application file for complete search history.

(56) References Cited

U.S. PATENT DOCUMENTS

| | | | |
|---|---|---|---|
| 7,209,948 | B2 | 4/2007 | Srinivasa |
| 8,706,685 | B1 | 4/2014 | Smith et al. |
| 8,994,732 | B2 | 3/2015 | Lee et al. |
| 9,141,711 | B2 | 9/2015 | Amrhein et al. |
| 2004/0021685 | A1 | 2/2004 | Denoue et al. |
| 2004/0194021 | A1* | 9/2004 | Marshall ............... G06F 17/241 715/232 |
| 2005/0091253 | A1 | 4/2005 | Cragun et al. |
| 2008/0098294 | A1 | 4/2008 | Le |
| 2008/0195657 | A1 | 8/2008 | Naaman et al. |
| 2009/0193327 | A1 | 7/2009 | Roychoudhuri et al. |
| 2010/0023851 | A1* | 1/2010 | Schormann ............ G06Q 10/10 715/232 |
| 2010/0030859 | A1 | 2/2010 | Huang |
| 2010/0070845 | A1 | 3/2010 | Facemire et al. |
| 2012/0229468 | A1 | 9/2012 | Lee et al. |
| 2013/0054636 | A1* | 2/2013 | Tang ..................... G06F 17/241 707/769 |
| 2014/0160153 | A1 | 6/2014 | Singh |
| 2014/0164984 | A1 | 6/2014 | Farouki |
| 2014/0337126 | A1* | 11/2014 | Ohanyan ............ G06Q 30/0251 705/14.49 |
| 2017/0034107 | A1* | 2/2017 | Krishnaswamy ....... H04L 51/32 |
| 2017/0262420 | A1 | 9/2017 | Dunne et al. |
| 2017/0286382 | A1 | 10/2017 | Dunne et al. |
| 2017/0286384 | A1 | 10/2017 | Dunne et al. |

OTHER PUBLICATIONS

Steinberg, M. et al., "Enhanced User Interaction to Qualify Web Resources by the Example of Tag Rating in Folksonomies," [Online] in, Int'l. Journal on Advances in Intelligent Systems, vol. 3, Nos. 3 & 4, 2010, [retrieved Mar. 10, 2016] retrieved from the Internet: <http://citeseerx.ist.psu.edu/viewdoc/download; isessionid=58C9BBBDDE529A5CA6BF1370340BBB10?doi=10.1.1.685.5541&rep=rep1&type=pdf>, 20 pg.

"Web Conferencing," [online] Wikipedia, the Free Encyclopedia, Dec. 3, 2015 [retrieved Dec. 9, 2015], retrieved from the Internet: <https://en.wikipedia.org/wiki/Web_conferencing>, 7 pg.

"Whiteboard," [online] Wikipedia, the Free Encyclopedia, Dec. 7, 2015 [retrieved Dec. 9, 2015], retrieved from the Internet: <https://en.wikipedia.org/wik/Whiteboard>, 4 pg.

IBM: List of IBM Patents or Patent Applications Treated as Related, 2 pg.

IBM et al., "Shared Whiteboard Approach to Multimedia Document Annotations," [online] IP.com Prior Art Database Technical Disclosure 000116438, Sep. 1, 1995, retrieved from the Internet: <http://priorart.ip.com/IPCOM/000116438>, 3 pg.

"Method and System for Providing a Multi-Modal Collaboration Framework," [online] IP.com Prior Art Database Technical Disclosure 000234913, Feb. 13, 2014, retrieved from the Internet: <http://priorart.ip.com/IPCOMM/000234913>, 6 pg.

"Recording Webinars Web Meetings," [online] Read Talk © 2016 [retrieved Jan. 12, 2016], retrieved from the Internet: <https://www.readytalk.com/products-services/recording>, 3 pg.

"8 Apps that Record Video Conference," [online] VoIP.Sol.com, Voice over IP Solutions & Conferencing Reviews, May 14, 2008 [retrieved Jan. 12, 2016], retrieved from the Internet: <http://www.voip-sol.com/6-apps-that-record-video-conferences/>, 4 pg.

"Recording Meetings, Meeting Recording—ClickMeeting," [online] ClickMeeting © 2016 [retrieved Apr. 1, 2016], retrieved from the Internet: <http://www.clickmeeting.com/meeting-recording>, 2 pg.

\* cited by examiner

| Presentation Title | Slide | Annotation | User_ID _444444 _Ranking | User_ID _555555 _Ranking | User_ID _666666 _Ranking | User_ID _444444 _Skill | User_ID _555555 _Skill | User_ID _666666 _Skill | Relevance Parameter |
|---|---|---|---|---|---|---|---|---|---|
| Baysian Inference: An Introduction | 1 | null | null | null | null | null | null | null | 0 |
| Baysian Inference: An Introduction | 2 | AN_1 | 5 | 4 | 6 | 6 | 2 | 8 | 0.371 |
| Baysian Inference: An Introduction | 3 | AN_2 | 8 | 5 | 6 | 2 | 7 | 8 | 0.638 |
| Baysian Inference: An Introduction | 3 | AN_3 | 7 | 4 | 1 | 2 | 8 | 10 | 0.177 |
| ↑310 | ↑312 | ↑314 | ↑316 | ↑318 | ↑320 | ↑322 | ↑324 | ↑326 | ↑328 |

```
┌─────────────────────────────────────────────────────────────────────────┐
│ Receiving a plurality of annotations for a presentation presented in a  │
│ web conference                                                          │
│                                  502                                    │
└─────────────────────────────────────────────────────────────────────────┘
                                    │
                                    ▼
┌─────────────────────────────────────────────────────────────────────────┐
│ Assign to each of the plurality of annotations a respective relevance   │
│ parameter, wherein each relevance parameter indicates a relevance of a  │
│ respective one of the plurality of annotations to a portion of the      │
│ presentation to which the annotation pertains                           │
│                                  504                                    │
└─────────────────────────────────────────────────────────────────────────┘
                                    │
                                    ▼
┌─────────────────────────────────────────────────────────────────────────┐
│ Generate, using a processor, for each of the annotations, a decay model │
│ based on the respective relevance parameter, wherein the decay model    │
│ indicates different durations of time the annotation is to be visible   │
│ to different participants participating in the web conference based on  │
│ respective expertise levels of the participants                         │
│                                  506                                    │
└─────────────────────────────────────────────────────────────────────────┘
                                    │
                                    ▼
┌─────────────────────────────────────────────────────────────────────────┐
│ Present each respective annotation with the presentation in accordance  │
│ with the decay model generated for the respective annotation            │
│                                  508                                    │
└─────────────────────────────────────────────────────────────────────────┘
```

PERSISTING ANNOTATIONS APPLIED TO AN ELECTRONIC HOSTED WHITEBOARD

BACKGROUND

The present invention relates to web conferencing, and more specifically, to presentations presented in a web conference.

Web conferencing is a popular means of collaboration among people. By leveraging use of a virtual white board, which is real time collaboration tool that may be hosted in a web conference, a presenter can convey visual information to an audience, for example text, images, etc. In addition, the presenter and/or other people collaborating in the web conference can add annotations to the virtual white board to share those annotations with other participants of the web conference. Thus, using a web conference with a hosted virtual white board, participants no longer need to all be present in the same physical meeting room in order to collaborate and share visual information.

SUMMARY

A system includes a processor programmed to initiate executable operations. The executable operations include receiving a plurality of annotations for a presentation presented in a web conference. The executable operations also can include assigning to each of the plurality of annotations a respective relevance parameter, wherein each relevance parameter indicates a relevance of a respective one of the plurality of annotations to a portion of the presentation to which the annotation pertains. The executable operations also can include generating processor, for each of the annotations, a decay model based on the respective relevance parameter, wherein the decay model indicates different durations of time the annotation is to be visible to different participants participating in the web conference based on respective expertise levels of the participants. The executable operations also can include presenting each respective annotation with the presentation in accordance with the decay model generated for the respective annotation.

A computer program includes a computer readable storage medium having program code stored thereon. The program code is executable by a processor to perform a method. The method includes receiving, by the processor, a plurality of annotations for a presentation presented in a web conference. The method also can include assigning, by the processor, to each of the plurality of annotations a respective relevance parameter, wherein each relevance parameter indicates a relevance of a respective one of the plurality of annotations to a portion of the presentation to which the annotation pertains. The method also can include generating, by the processor, for each of the annotations, a decay model based on the respective relevance parameter, wherein the decay model indicates different durations of time the annotation is to be visible to different participants participating in the web conference based on respective expertise levels of the participants. The method also can include presenting, by the processor, each respective annotation with the presentation in accordance with the decay model generated for the respective annotation.

DETAILED DESCRIPTION

The present invention relates to web conferencing, and more specifically, to presentations presented in a web conference.

In accordance with the inventive arrangements disclosed herein, a presentation can be presented to a plurality of participants participating in a web conference. One or more participants in the web conference can contribute annotations to the presentation, and a system hosting the web conference can receive the annotations. The system can assign to each annotation a respective relevance parameter. Each relevance parameter can indicate a relevance of a respective annotation to a portion of the presentation to which the annotation pertains.

Based on the relevance parameter, the system can, for each annotation, generate a decay model. The decay model for each annotation can control the availability of the annotation to be visible to respective participants participating in the web conference. For example, the decay model can indicate different durations of time the annotation is to be visible to different participants participating in the web conference based on respective expertise levels of the participants. Each annotation can be presented with the presentation in accordance with the decay model generated for the respective annotation. Various other operations also can be performed based on the relevance parameters.

Several definitions that apply throughout this document now will be presented.

As defined herein, the term "web conference" means a real time communication session in which a plurality of participants are displayed the same view (e.g., a virtual white board) on their client devices and in which two or more of the plurality of participants may contribute annotations to a presentation presented in the displayed view.

As defined herein, the term "presentation" means text, images, video, audio and/or the like presented in a web conference.

As defined herein, the term "virtual white board" means an interactive view hosted in a web conference in which a presentation is presented and in which two or more participants of the web conference may provide, in real time, annotations related to the presentation.

As defined herein, the term "annotation" means text contributed by a participant in a web conference to a presentation presented in the web conference. An annotation may contribute additional material to the presentation, provide comments on the presentation, ask questions regarding the presentation, or the like.

As defined herein, the term "feedback" means information obtained from a participant in a web conference pertaining to an annotation contributed to a web conference.

As defined herein, the term "ranking" means a value assigned to an annotation in feedback or based on feedback.

As defined herein, the term "relevance parameter" means a value assigned to an annotation that indicates a relevance of the annotation to a portion of a presentation to which the annotation pertains.

As defined herein, the term "decay model" means a functional data structure specifying parameters used to determine one or more time frames in which an annotation is to be presented to respective participants participating in a web conference or respective users viewing the web conference.

As defined herein, the term "client device" means a processing system including at least one processor and memory that requests shared services from a server, and with which a user directly interacts. Examples of a client device include, but are not limited to, a workstation, a desktop computer, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "server" means at least one processing system including at least one processor and memory that hosts shared services and provides the shared services to a plurality of client devices.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "participant" means a person (i.e., a human being) participating in a web conference.

As defined herein, the term "presenter" means a person (i.e., a human being) that presents in a presentation in a web conference.

As defined herein, the term "user" means a person (i.e., a human being). A user may be a participant in a web conference, or a user who is not a participant in the web conference but who later views the web conference.

Figure 1:
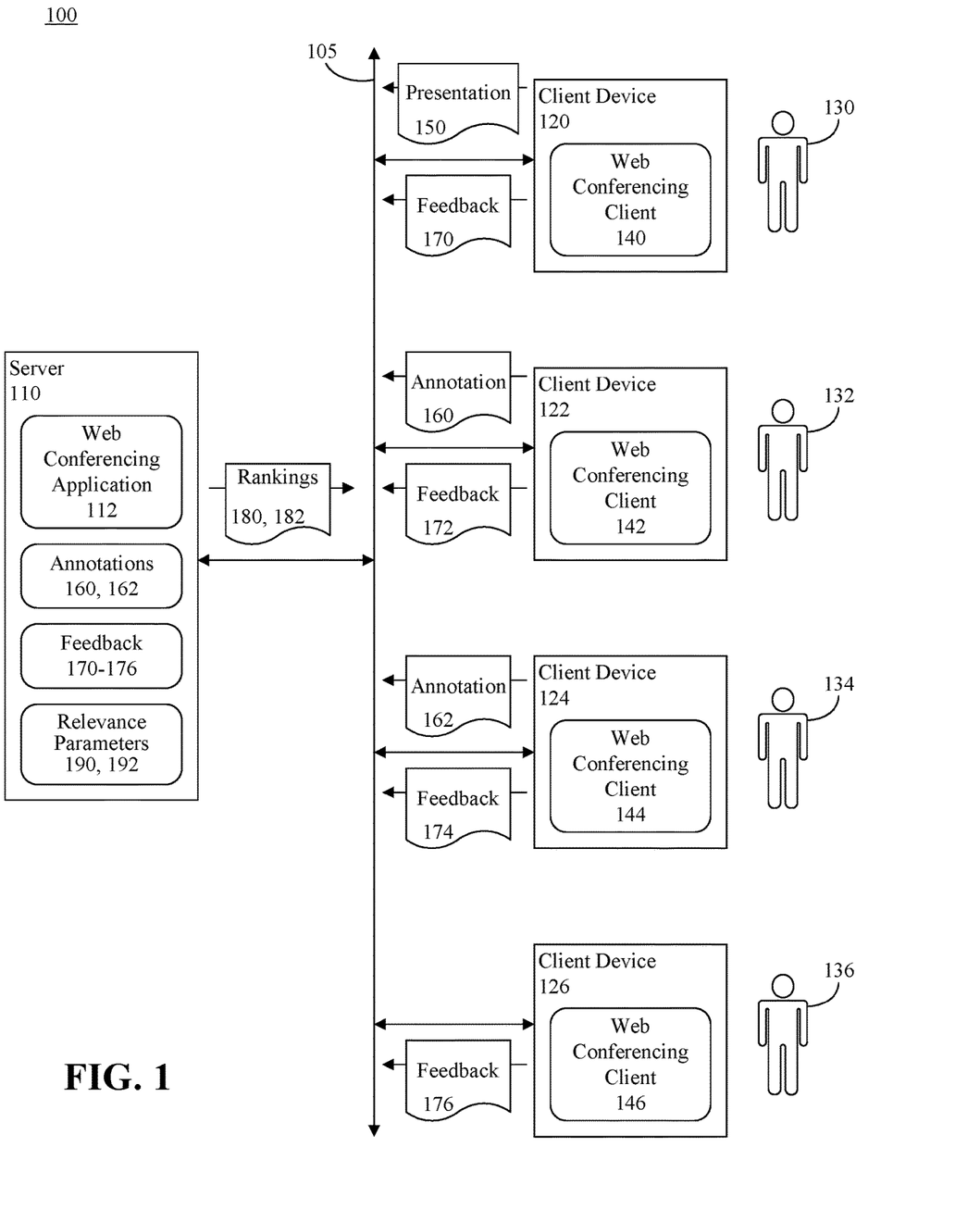
FIG. 1 is a block diagram illustrating an example of a network computing environment.

FIG. 1 is a block diagram illustrating an example of a network computing environment 100. The network computing environment 100 can include a server 110 and a plurality of client devices 120, 122, 124, 126. The client devices 120-126 can be communicatively linked to the server 110 via a communication network 105. The communication network 105 is the medium used to provide communications links between various devices and data processing systems connected together within the network computing environment 100. The communication network 105 may include connections, such as wire, wireless communication links, or fiber optic cables. The communication network 105 can be implemented as, or include, any of a variety of different communication technologies such as a local area network (LAN), a wide area network (WAN), a wireless network, a mobile network, a Virtual Private Network (VPN), the Internet, the Public Switched Telephone Network (PSTN), or the like.

The server 110 can execute a web conferencing application 112 configured to host a web conference in which participants 130, 132, 134, 136 participate using client devices 120-126. In this regard, each client device 120-126 can execute a respective web conferencing client 140, 142, 144, 146 via which the participants 130-136 participate in the web conference. The web conferencing clients 140-146 can be web browsers or other applications specifically configured for web conferencing.

At least one participant, for example the participant 130, can provide a presentation 150 in the web conference that is presented to each of the participants 130-136. For example, the participant 130 can use the web conferencing client 140 to provide the presentation 150 on a virtual white board hosted by the web conferencing application 112. The web conferencing application 112 also can present virtual white board, with the presentation 150, to the other participants 132-136.

While the presentation 150 is presented, one or more participants 130-136 can provide annotations to the presentation 150 by interacting with their respective web conferencing clients 140-146. For example, via the web conferencing client 142, the participant 132 can provide the annotation 160 on the virtual white board or in another view hosted by the web conferencing application 112. The participant 134 also can generate an annotation 162 in a similar manner using the web conferencing client 144.

In response to receiving each annotation 160, 162 from a respective web conferencing client 140-146, the web conferencing application 112 can store the annotation 160, 162 to a computer readable storage medium in a manner that associates the annotation 160, 162 with the presentation 150 and the particular portion of the presentation (e.g., page, slide, etc.) for which the annotation is generated. For instance, the web conferencing application 112 can store the annotations 160, 162 to a database contained on the computer readable storage medium. The web conferencing application 112 also can present the annotations 160, 162 to one or more of the participants 130-136, for example by presenting the annotations 160, 162 on the virtual white board on which the portion of the presentation 150 to which the annotation 160, 162 pertains is presented, or by presenting the annotations 160, 162 in another view.

The participants 130-136 also can use the web conferencing clients 140-146 to provide feedback relating to the annotations 160, 162. For instance, in response to the annotation 160 being presented to the participants 130-136, one or more of the participants 130-136 can provide respective feedback 170, 172, 174, 176 relating to the annotation 160. Similarly, response to the annotation 162 being presented to the participants 130-136, one or more of the participants 130-136 can provide respective feedback 170-176 relating to the annotation 160. The participants 130-136 can generate the feedback 170-176 by interacting with one or more menus presented by their respective web conferencing clients 140-146. In response to receiving participant inputs to create the feedback 170-176, the respective web conferencing clients 140-146 can communicate the feedback 170-176 to the web conferencing application 112.

Each particular feedback 170-176 can include a first value indicating a rating assigned to the respective annotation 160 participant 130-136 providing the feedback 170-176 and a second value indicating an expertise level of the participant 130-136 providing the feedback 170-176. In illustration, the feedback 174 can include a value indicating a rating the participant 134 assigns to the annotation 160 and a value indicating the expertise level of the participant 134 in the subject matter to which the annotation 160 pertains, for example the subject matter of a particular portion of the presentation for which the annotation is provided and/or the subject matter of the annotation itself. In one arrangement, the participant 134 can enter his or her expertise level using the web conferencing client 144, or web conferencing client 144 can access and process a user profile of the participant 134 to determine the expertise level. In another arrangement, the feedback 174, when sent by the web conferencing client 144 need only include the value indicating the rating, and the web conferencing application 112 can append to the feedback 174 the expertise level of the participant. For instance, the web conferencing application 112 can access and process a user profile of the participant 134 to determine the expertise level.

For each feedback 170-176, the first value can be any value within a range of values suitable for rating the annotation 160, for example within a range between zero and ten, with zero representing a low rating and ten representing a high rating. Similarly, the second value can be any value within a range of values suitable for indicating the expertise level of the participant 134, for example within a range between zero and ten, with zero representing no expertise and ten representing a very high level of expertise. The present arrangements, however, are not limited to these examples. The web conferencing application 112 can process the feedback 170-176 received for each annotation 160, 162, and assign a ranking 180, 182 to each of the respective annotations 160, 162 accordingly, as will be described.

For each annotation 160, 162, the web conferencing application 112 also can process the content of the annotation 160, 162 and the content of the portion of the presentation 150 to which the annotation 160, 162 pertains using natural language processing (NLP), semantic analysis and regression analysis on the respective content to determine a level of correlation between the annotation 160, 162 and the presentation 150. For example, the web conferencing application 112 can apply NLP and semantic analysis to identify concepts contained in the annotation 160 and identify concepts contained in the portion of the presentation 150 for which the annotation 160 is generated. The web conferencing application 112 can apply regression analysis to results of the NLP and semantic analysis to determine the level of correlation between the annotation 160 and the portion of the presentation 150. The web conferencing application 112 can calculate the relevance parameter 190 based on such level of correlation. The web conferencing application also can calculate a relevance parameter 192 for the annotation 162 in a similar manner.

The higher the level of correlation between the annotation 160 and the portion of the presentation 150 to which the annotation 160 applies, the higher the relevance parameter 190 will be. Conversely, the lower the level of correlation between the annotation 160 and the portion of the presentation, the lower the relevance parameter 190 will be. By way of example, if the portion of the presentation 150 to which the annotation 160 applies includes text pertaining to fitting a curve to data points, and the annotation 160 includes text asking about distances between a data point and the curve, the relevance parameter assigned to annotation 160 can be relatively high (e.g., closer to a value of 1 than to 0). On the other hand, if the annotation 160 includes text in the nature of "I am having difficulty understanding this concept," the relevance parameter assigned to annotation 160 can be relatively low (e.g., closer to a value of 0 than to 1).

Based on the respective relevance parameters 190, 192, the web conferencing application 112 can selectively present the annotations 160, 162 to different participants 130-136 for differing amounts of time, for example using decay models, which will be described. The web conferencing application 112 also can determine where on virtual white board the annotations 160, 162 are presented based on the respective relevance parameters 190, 192, as well as perform other processes, which will be described in greater detail.

At this point it should be noted that NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the web conferencing application 112 to implement NLP and semantic analysis. Regression analysis also is known to those of ordinary skill in the art. Various types of regression analysis that may be used in the present arrangements include, but are not limited to, statistical regression, linear regression, parametric regression, Poisson regression, logistic regression, generalized regression, and the like.

Figure 2:
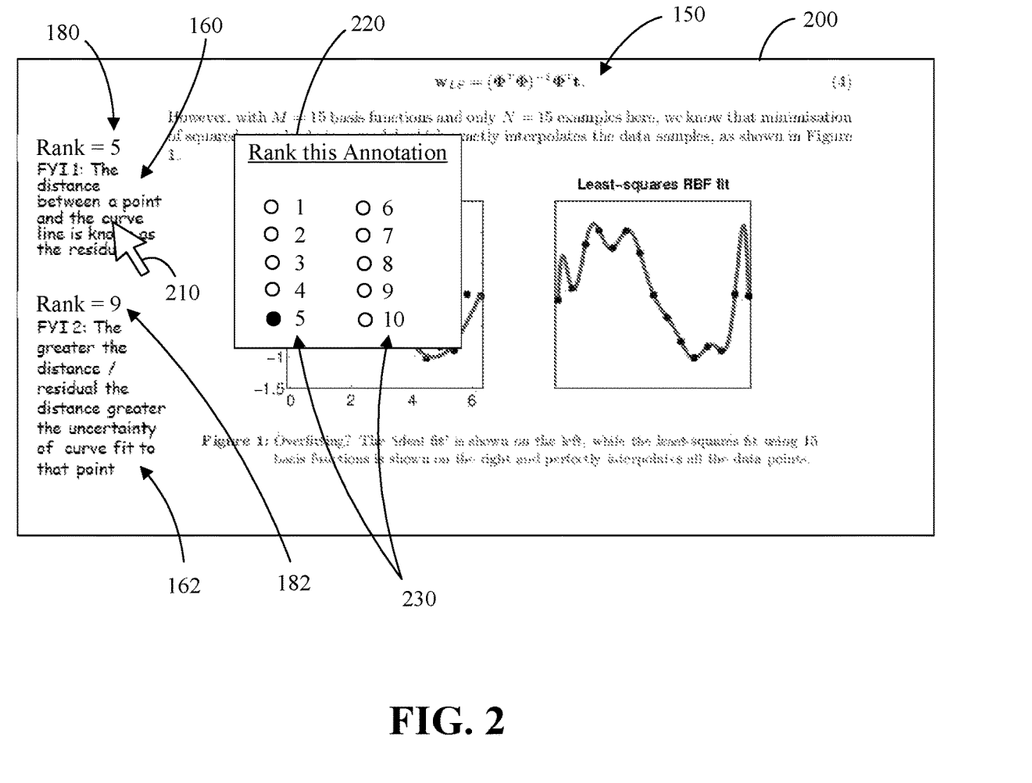
FIG. 2 depicts an example view of a virtual white board in which a presentation is presented during a web conference.

FIG. 2 depicts an example view of a virtual white board 200 in which a presentation 150 is presented during a web conference. The virtual white board 200 can be presented on the respective client devices 120-136 by the respective web conferencing clients 140-146. As noted, while the presentation 150 is presented, one or more participants 130-136 may provide annotations 160, 162 for the presentation 150, and one or more of the participants also may provide feedback 170-176 regarding the annotations 160, 162. To provide feedback 174 for an annotation 160, the participant 134 can select the annotation 160 using a cursor 210 and initiate the web conferencing client 144 to present a menu 220, for example by right-clicking on the annotation 160. From the menu 220, the participant 134 can select a value 230 to assign a rank to the annotation 160. For instance, the participant can select a radio button or the like presented next to a desired value. Optionally, the menu 220 also can prompt the participant to enter a value indicating the participant's level of expertise in the subject matter of the presentation, for example the portion of the presentation for which the annotation 160 is generated. As noted, in anther arrangement such value can be obtained by accessing and processing the participant's user profile.

The web conferencing application 112 can generate the rankings 180, 182 based on feedback 170-176 received from one or more of the participants 130-136, as will be described. Further, the web conferencing application 112 can display the rankings 180, 182 with the respective annotations 160, 162. For instance, the web conferencing application 112 can display the rankings 180, 182 immediately above, below or next to the respective annotations 160, 162. In one arrangement, the web conferencing application 112 can display the rankings 180, 182 only to the participant 130 who is the presenter of the presentation 150. In another arrangement, the web conferencing application 112 can display the rankings 180, 182 to selected participants 130-136, for example participants 130-136 having a threshold level of expertise in the subject matter of the presentation. In yet another arrangement, the web conferencing application 112 can display the rankings 180, 182 to all of the participants 130-136.

Also, locations in the virtual white board 200 where the annotations 160, 162 are placed can be determined based on the respective relevance parameters 190, 192 assigned to each respective annotation 160, 162. The annotation 160, 162 having the highest relevance parameter 190, 192 can be can be placed closest to the portion (e.g., text or image) of the presentation 150 to which the annotation 160, 162 pertains, while annotations 160, 162 having lower relevance parameters 190, 192 can be placed further away from that portion of the presentation. For instance, if there are three annotations 160, 162 each pertaining to the same portion of the presentation 150, the annotation 160, 162 with the lowest relevance parameter 190, 192 can be placed furthest away from that portion of the presentation 150 in comparison to the other annotations 160, 162.

Moreover, the length of time each annotation 160, 162 remains displayed for each particular participant 130-136 can be different. Each length of time can be determined based on the relevance parameter assigned to the respective annotation 160, 162, and the level of expertise of the particular participant 130-136, which will be further described.

Figure 3:
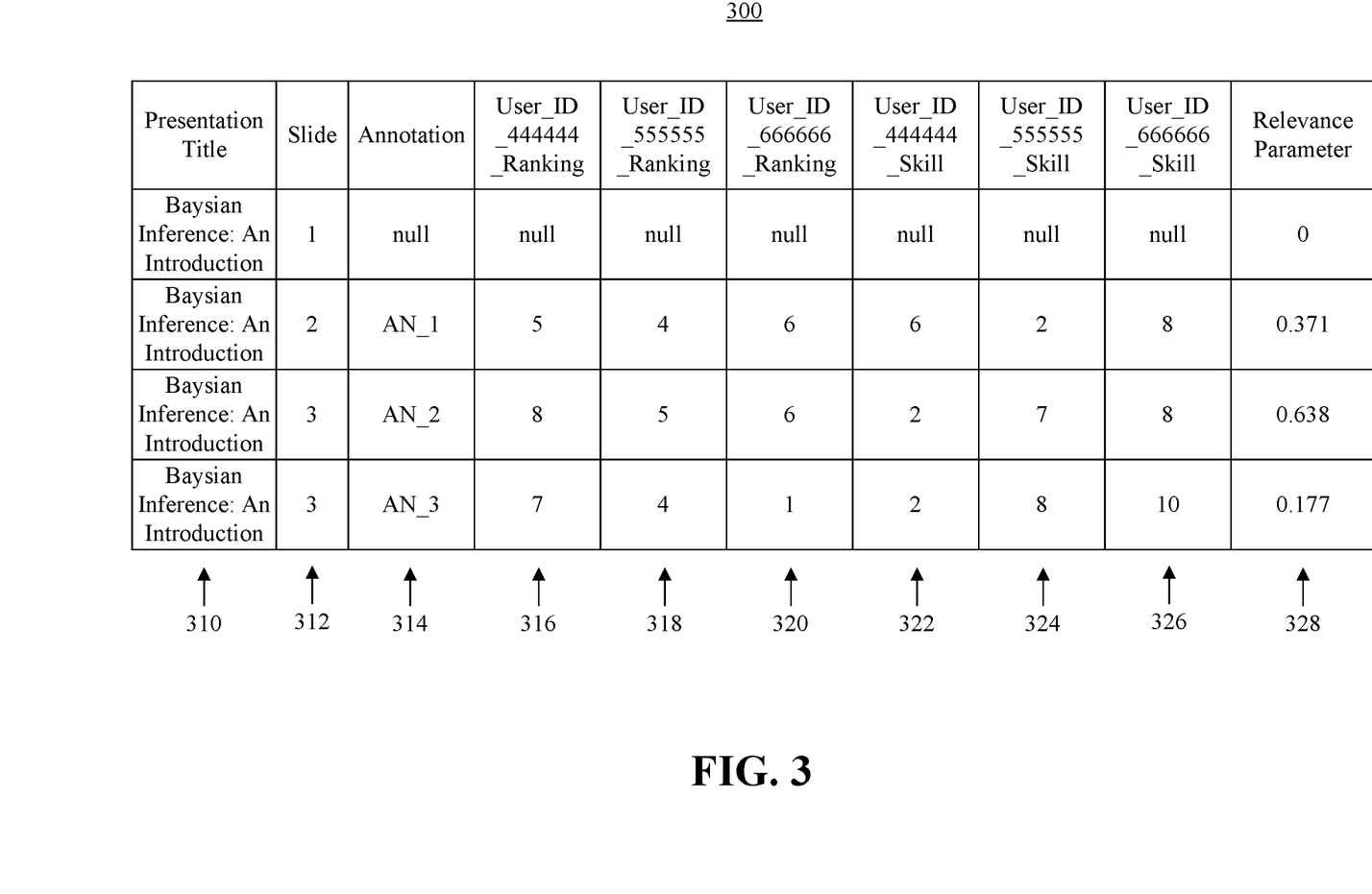
FIG. 3 depicts a data table in which feedback for annotations may be stored.

FIG. 3 depicts a data table 300 in which feedback 170-176 for annotations 160, 162 may be stored. In this example, the data table 300 includes feedback from three participants 130-136, having respective user identifiers User_ID_444444, User_ID_555555 and User_ID_666666, for three annotations, indicated as AN_1, AN_2 and AN_3. Of course, there can be any number of portions of the presentation, annotations and participants, and the present arrangements are not limited to this example.

The data table 300 can include a column 310 indicating a title of the presentation 150, a column 312 indicating particular portions (e.g., slides) of the presentation 150, and a column 314 indicating the respective annotations AN_1, AN_2 and AN_3. The data table 300 also can include a column 316 indicating the rankings assigned by the participant having User_ID_444444 to each of the respective annotations AN_1, AN_2 and AN_3, a column 318 indicating the rankings assigned by the participant having User_ID_555555 to each of the respective annotations AN_1, AN_2 and AN_3, and a column 320 indicating the rankings assigned by the participant having User_ID_666666 to each of the respective annotations AN_1, AN_2 and AN_3. As noted, each ranking can indicate how the respective participant personally ranks the importance of the respective to the presentation.

The table also can include a column 322 indicating a level of expertise of the participant having User_ID_444444 to subject matters to which the respective annotations AN_1, AN_2 and AN_3 pertain, a column 324 indicating a level of expertise of the participant having User_ID_555555 to subject matters to which the respective annotations AN_1, AN_2 and AN_3 pertain, and a column 326 indicating a level of expertise of the participant having User_ID_666666 to subject matters to which the respective annotations AN_1, AN_2 and AN_3 pertain. The data table 300 also can include a column 328 for a relevance parameter calculated for each of the annotations AN_1, AN_2 and AN_3. The relevance parameter for each annotation AN_1, AN_2 and AN_3 can indicate the annotation's relevance to the portion of the presentation for which the annotation is provided, as will be further described.

In this example, there are no annotations provided for slide 1 of the presentation, there is one annotation. Thus, for slide 1, values in columns 316-326 are null and the relevance parameter is zero. Annotation AN_1 is provided for slide 2 of the presentation, and annotations AN_2 and AN_3 are provided for slide 3 of the presentation. Each of the participants User_ID_444444, User_ID_555555, User_ID_666666 have provided feedback for each of the annotations AN_1, AN_2 and AN_3. Thus, the web conferencing application 112 can calculate the relevance parameter for each of the annotations AN_1, AN_2 and AN_3 based on the participant rankings and level of expertise of each of the participants in the subject matters to which the respective annotations pertain, for example the subject matter of a particular portion of the presentation for which the annotation is provided and/or the subject matter of the annotation itself.

As noted, each of the participants may input his or her level of expertise indicated in columns 322-326, or the web conferencing application 112 or web conferencing client 140 can automatically determine each level of expertise indicated in columns 322-326. To automatically determine each level of expertise, the web conferencing application 112 or web conferencing client 140 can perform NLP and semantic analysis on the respective annotation and/or on information presented in the slide to which the annotation pertains. The NLP and semantic analysis can identify terms, concepts and information contained in the annotation and/or presentation information. The web conferencing application 112 or web conferencing client 140 can compare such terms and contents to information contained in the respective participant's user profile, for example areas of expertise indicated in the participant's user profile. Based on such comparison, the web conferencing application 112 or web conferencing client 140 can generate a value indicating the participant's level of expertise, which web conferencing application 112 can store in the appropriate column and row of the data table 300.

The web conferencing application 112 also can apply NLP, semantic analysis and regression analysis to determine the relevance parameter for each annotation AN_1, AN_2 and AN_3, as previously described.

For each annotation AN_1, AN_2 and AN_3, the web conferencing application 112 can process the assigned rankings and the level of expertise of the participants assigning the rankings to derive a net ranking. For example, each ranking assigned by a participant can be assigned a weight based on the expertise of the participant. Thus, rankings provided by participants having higher expertise can be given more weight than participants having a lower level of expertise. The web conferencing application 112 can average the weighted rankings and normalize those rankings to a ranking scale being used, for example within a range of zero to ten. The rankings 180, 182 depicted in FIG. 2 can be net rankings determined in this manner.

The web conferencing application 112 can determine a period of time for which to present each annotation AN_1, AN_2 and AN_3 based on the relevance parameter and the level of expertise of the participant to whom the annotation is presented. For example, based on the relevance parameter for each annotation AN_1, AN_2 and AN_3, the web conferencing application 112 can generate an annotation decay model for each annotation.

The web conferencing application 112 further may analyze results of the NLP and semantic analysis to compare each annotation AN_1, AN_2 and AN_3 with previously received annotations. In some cases, the same types of annotations may be received repeatedly. For example, different annotations may ask the same question, but in different ways. Comparing the results of NLP and semantic analysis from different annotations 160, 162 can allow the web conferencing application 112 to identify such annotations. Because the same question is being asked repeatedly, the web conferencing application 112 can select at least one of the annotations 160, 162 identified by the web conferencing application 112 as best representing the question (e.g., having the highest relevance parameter 190, 192), and persist that annotation the presentation 150. This can reduce the likelihood of other participants continuing to ask the same question, and prompt discussion of the question during subsequent presentations of the same presentation 150. In one non-limiting arrangement, to persist an annotation 160, 162 to the presentation 150, the web conferencing application 112 can update the relevance parameter 190, 192 assigned to that annotation 160, 162 to be equal to or greater than 0.90.

In one aspect of the present arrangements, if an annotation 160, 162 has a relevance parameter 190, 192 and/or ranking that exceeds a threshold value, the web conferencing application 112 can automatically update the presentation 150 to include the information contained in the annotation 160, 162. In another aspect, the web conferencing application 112 can generate a notification to a presenter of the presentation 150 (e.g., the participant 130) indicating to the presenter that the presenter should consider updating the presentation 150 to include in the presentation 150 the content of the annotation 160, 162. For example, responsive to the web conferencing application 112 assigning to an annotation 160, 162 a relevance parameter 190, 192 that is equal to or greater than 0.90, the web conferencing application 112 can generate the notification.

Figure 4:
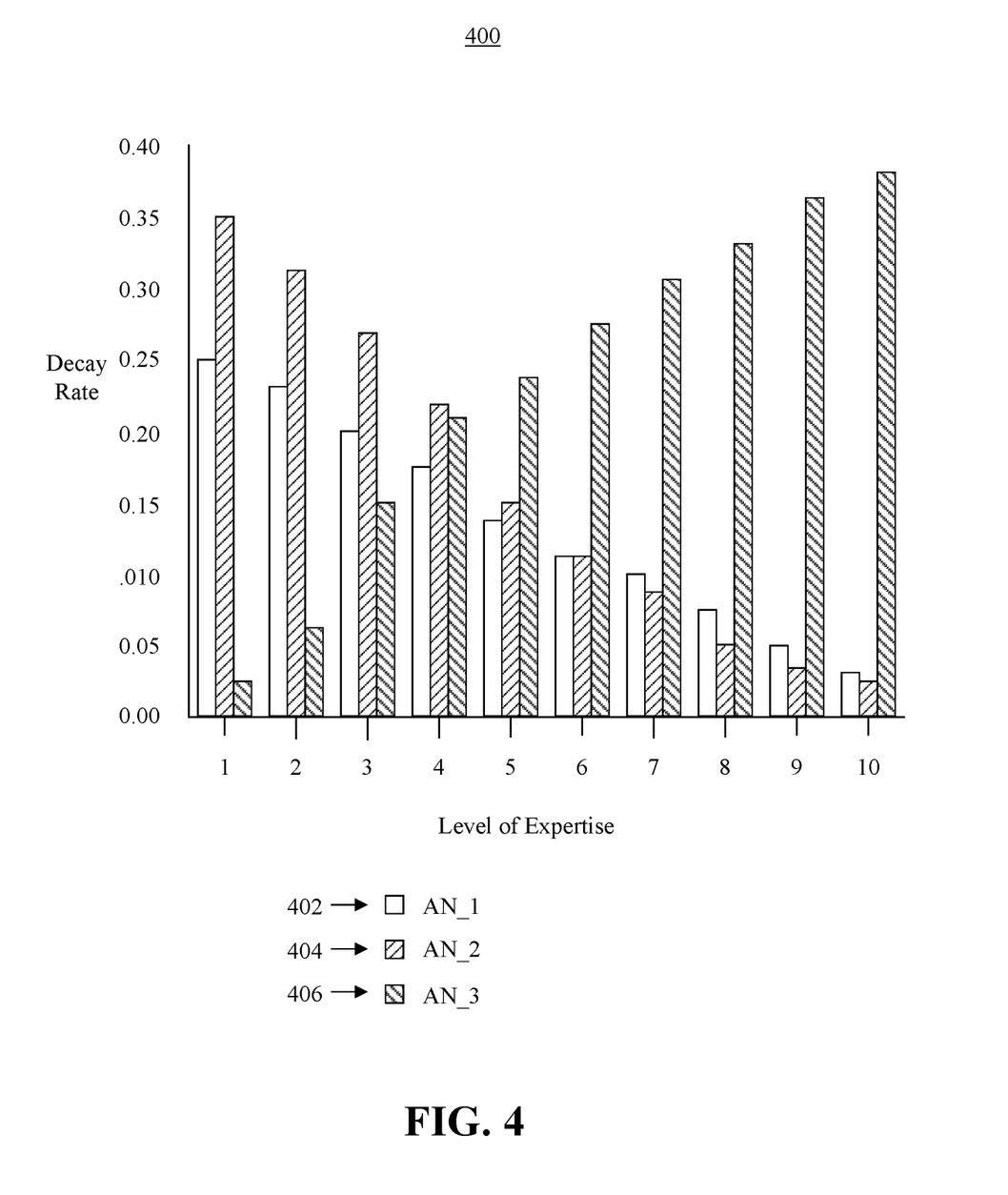
FIG. 4 depicts a chart presenting a plurality of annotation decay models for various annotations.

FIG. 4 depicts a chart 400 presenting a plurality of annotation decay models 402, 404, 406 for various annotations 160, 162 (e.g., annotations AN_1, AN_2 and AN_3 of FIG. 3). The web conferencing application 112 can generate each decay model 402, 404, 406 based on a value of a corresponding relevance parameter 190, 192 (e.g., annotations AN_1, AN_2 and AN_3 of FIG. 3, respectively). For example, the web conferencing application 112 can execute an algorithm configured to generate a corresponding decay model 402, 404, 406 using a respective relevance parameter 190, 192 as an input variable. The algorithm can be configured to output decay models 402, 404, 406 having desired annotation decay characteristics for given relevance parameters 190, 192.

Each decay model 402, 404, 406 can indicate, for a respective annotation, different durations of time the annotation is to be visible to different participants 130-136 having various levels of expertise. For example, the decay models 402, 404, 406 can indicate rates of decay. The higher the decay rate, the shorter the period of time will be that the web conferencing application 112 presents the annotation. The lower the decay rate, the longer the period of time will be that the web conferencing application 112 presents the annotation. For example, assume that annotation AN_1 is presented to a participant 136 having a level of expertise that if 3. According to the decay model 402, the decay rate for that annotation AN_1, when presented to the participant 136, is 0.20, or 20%. Thus, a standard time period, which can be a predetermined time period, represents 20% of the total period the annotation AN_1 is to be presented. Thus, if the standard time period is 10 seconds, the annotation AN_1 will be presented for 50 seconds. If, however, the standard time period is 1 minute, the annotation AN_1 will be presented for 5 minutes. The present arrangements are not limited to any particular period of time being the standard period of time, however. Nevertheless, certain annotations can be presented to certain participants longer in comparison to other participants. In this regard, the web conferencing application 112 can make the annotations 160, 162 selectively visible to different participants 130, 132 for different amounts of time based on the decay models 402, 404, 406.

In illustration, annotations having a low relevance parameter may not be of significant interest to highly skilled participants, for example such annotations may be directed to fundamental concepts. Thus, such annotations can be presented to highly skilled participants for a short period of time. Participants who are novices, however, may find such annotations useful, and the annotations can be presented for a longer period time to such participants. On the other hand, annotations having a high relevance parameter may be of significant interest to highly skilled participants. For example, such annotations may pertain to advanced concepts. Thus, such annotations may be presented to expert participants for a longer period of time. Participants who are novices may not have a high level of interest in such annotations, and thus the annotations can be presented to the participants who are novices for a shorter period of time.

In one aspect, at least one annotation 160, 162 that is highly complex can be presented only to participants having a level of expertise that exceeds a threshold value. In this regard, the web conferencing application 112 can during the web conference, selectively make visible the annotation 160, 162 to certain participants 130-136, while not presenting such annotations 160, 162 to other ones of the participants 130-136. The web conferencing application 112 can identify such annotations 160, 162 based, at least in part, on the relevance parameters assigned to such annotations 160, 162. In addition, the web conferencing application 112 also can consider data indicating the complexity of the annotations 160, 162 as indicated by the NPL and semantic analyses performed on the annotations 160, 162.

The decay models 402-406 also can be used to control availability of the annotations to other users who are not participants in the web conference, but who view web conference, and thus the presentation 150, at a later time by playing back a recording of the web conference. The web conferencing application 112 can access user profiles of the users to determine their levels of expertise, for example as previously described, and apply the decay models 402-406 accordingly.

The web conferencing application 112 need not generate a decay model 402-406 for certain annotations 160, 162 having a very high relevance parameter (e.g., equal to or greater than 0.9). Instead, the web conferencing application 112 can persist such annotations 160, 162 to the presentation 150, as previously noted.

Figure 5:
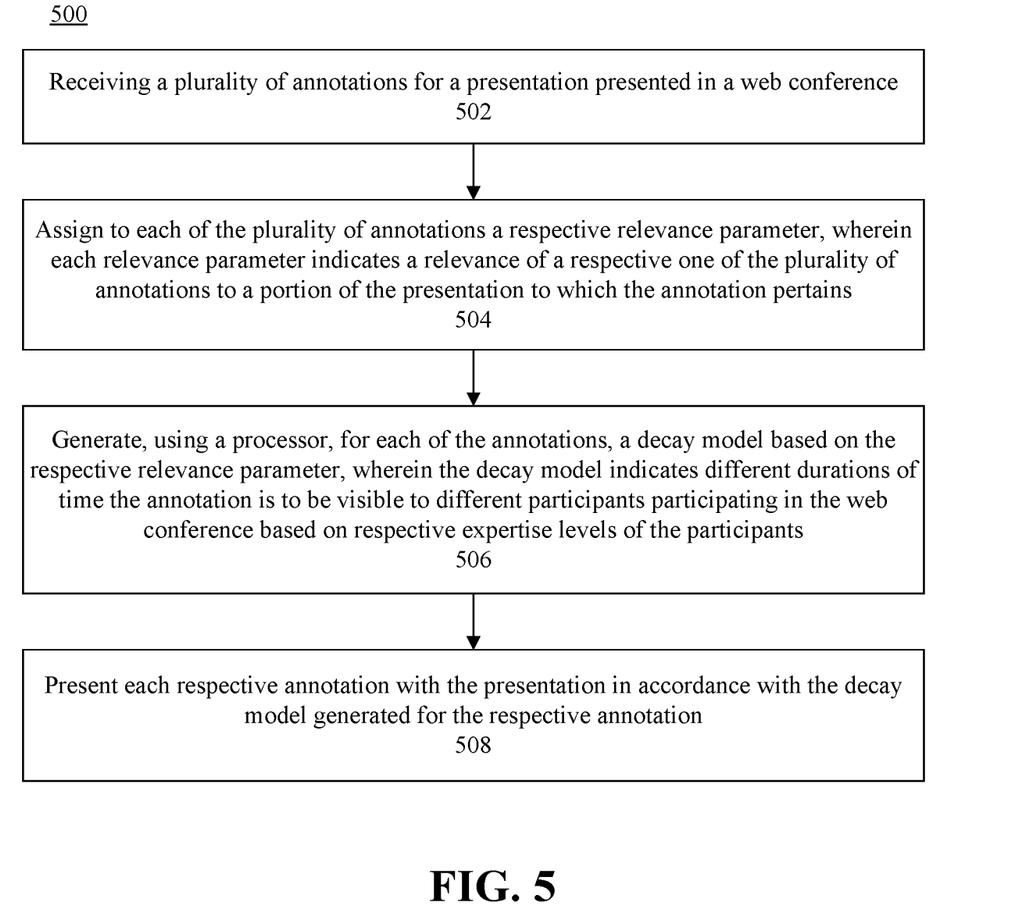
FIG. 5 is a flow chart illustrating an example of a method of present annotations with a presentation in accordance with decay models generated for the respective annotations.

FIG. 5 is a flow chart illustrating an example of a method 500 of present annotations with a presentation in accordance with decay models generated for the respective annotations. At step 502, a plurality of annotations can be received for a presentation presented in a web conference. At step 504, a respective relevance parameter can be assigned to each of the plurality of annotations. Each relevance parameter can indicate a relevance of a respective one of the plurality of annotations to a portion of the presentation to which the annotation pertains. At step 506, for each of the annotation, a decay model can be generated. The decay model can be based on the respective relevance parameter and can indicate different durations of time the annotation is to be visible to different participants participating in the web conference based on respective expertise levels of the participants. At step 508, each respective annotation can be presented with the presentation in accordance with the decay model generated for the respective annotation.

Figure 6:
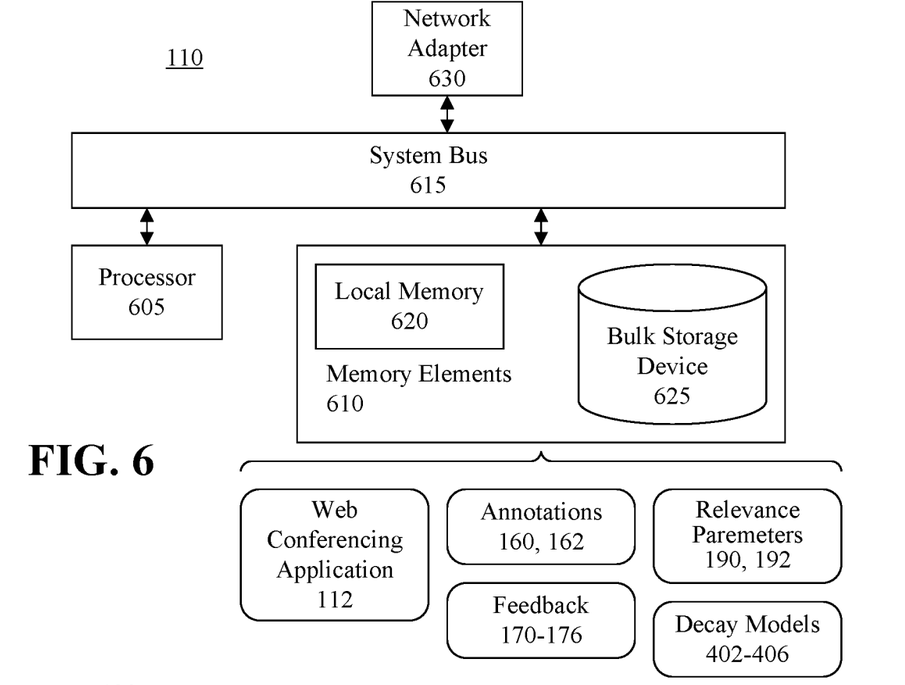
FIG. 6 is a block diagram illustrating example architecture for a server configured to host a web conference.

FIG. 6 is a block diagram illustrating example architecture for the server 110. The server 110 can include at least one processor 605 (e.g., a central processing unit) coupled to memory elements 610 through a system bus 615 or other suitable circuitry. As such, the server 110 can store program code within the memory elements 610. The processor 605 can execute the program code accessed from the memory elements 610 via the system bus 615. It should be appreciated that the server 110 can be implemented in the form of any system including a processor and memory that is capable of performing the functions and/or operations described within this specification. For example, the server 110 can be implemented as a single processing system or a plurality of communicatively linked processing systems.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The server 110 also can include one or more cache memories (not shown) that provide temporary storage of at least some program code in order to reduce the number of times program code must be retrieved from the bulk storage device 625 during execution.

One or more network adapters 630 also can be coupled to server 110 to enable the server 110 to become coupled to other devices, systems, computer systems, remote printers, and/or remote storage devices through intervening private or public networks. Modems, cable modems, transceivers, and Ethernet cards are examples of different types of network adapters 630 that can be used with the server 110.

As pictured in FIG. 6, the memory elements 610 can store the web conferencing application 112 of FIG. 1. Being implemented in the form of executable program code, the web conferencing application 112 can be executed by the server 110 and, as such, can be considered part of the server 110. The memory elements 610 also can store the annotations 160, 162, the feedback 170-176 and the relevance parameters 190, 192 of FIG. 1, as well as the decay models 402-406 of FIG. 4. The web conferencing application 112, annotations 160, 162, feedback 170-176, relevance parameters 190, 192 and decay models 402-406 are functional data structures that impart functionality when employed as part of the server 110.

Figure 7:
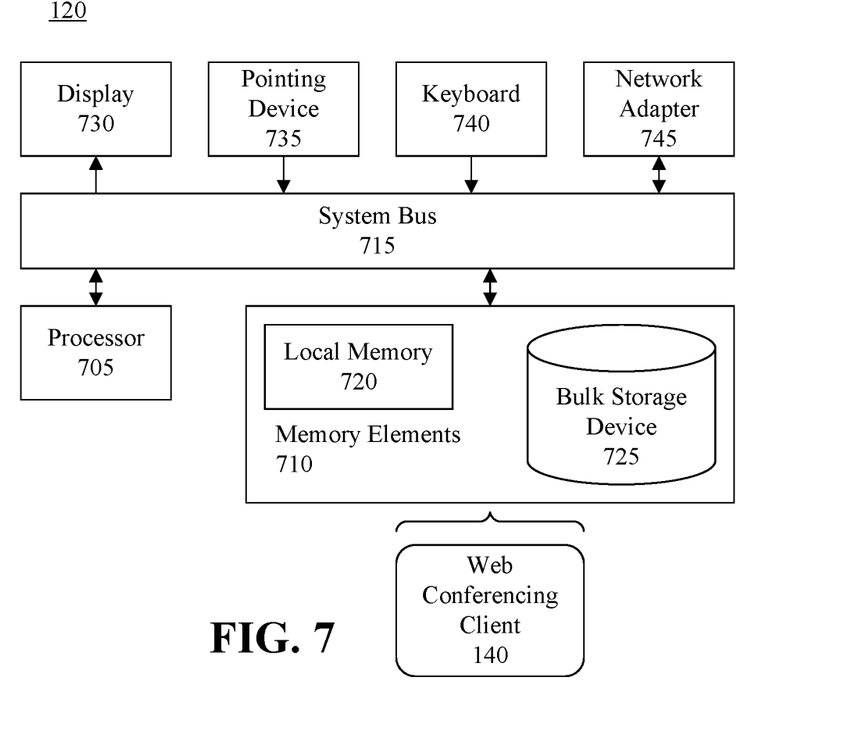
FIG. 7 is a block diagram illustrating example architecture for a client device.

FIG. 7 is a block diagram illustrating example architecture for the client device 120. The client devices 122-126 can be configured in a similar manner.

The client device 120 can include at least one processor 705 (e.g., a central processing unit) coupled to memory elements 710 through a system bus 715 or other suitable circuitry. As such, the client device 120 can store program code within the memory elements 710. The processor 705 can execute the program code accessed from the memory elements 710 via the system bus 715. It should be appreciated that the client device 120 can be implemented in the form of any system including a processor and memory that is capable of performing the functions and/or operations described within this specification.

The memory elements 710 can include one or more physical memory devices such as, for example, local memory 720 and one or more bulk storage devices 725. The client device 120 also can include one or more cache memories (not shown) that provide temporary storage of at least some program code in order to reduce the number of times program code must be retrieved from the bulk storage device 725 during execution.

Input/output (I/O) devices such as a display 730, and, optionally, a pointing device 735 and/or keyboard 740 can be coupled to the client device 120. The I/O devices can be coupled to the client device 120 either directly or through intervening I/O controllers. For example, the display 730 can be coupled to the client device 120 via a graphics processing unit (GPU), which may be a component of the processor 705 or a discrete device. One or more network adapters 745 also can be coupled to client device 120 to enable the client device 120 to become coupled to other systems, computer systems, remote printers, and/or remote storage devices through intervening private or public networks. Modems, cable modems, transceivers, and Ethernet cards are examples of different types of network adapters 745 that can be used with the client device 120.

As pictured in FIG. 7, the memory elements 710 can store the web conferencing client 140. Being implemented in the form of executable program code, the web conferencing client 140 can be executed by the client device 120 and, as such, can be considered part of the client device 120. Moreover, the web conferencing client 140 is functional data structure that imparts functionality when employed as part of the client device 120.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
receiving a plurality of annotations for a presentation presented in a web conference;
assigning to each of the plurality of annotations a respective relevance parameter, wherein each relevance parameter indicates a relevance of a respective one of the plurality of annotations to a portion of the presentation to which the annotation pertains;
generating for each of the annotations, a decay model based on the respective relevance parameter, wherein the decay model indicates, based on respective expertise levels of participants participating in the web conference, a first duration of time the annotation is to be visible to at least a first participant participating in the web conference, and at least a second duration of time the annotation is to be visible to at least a second participant participating in the web conference, wherein the second duration of time is different than the first duration of time;
presenting each respective annotation with the presentation in accordance with the decay model generated for the respective annotation;
identifying at least one annotation assigned a respective relevance parameter that exceeds a threshold value; and
responsive to identifying the at least one annotation assigned a respective relevance parameter that exceeds the threshold value, automatically generating a notification to a presenter of the presentation indicating to the presenter that the presenter should consider updating the presentation to include in the presentation content of the annotation assigned the respective relevance parameter that exceeds the threshold value.

2. The system of claim 1, wherein the decay model for each annotation further controls availability of the annotation to users who are not participants in the web conference, but who view the web conference.

3. The system of claim 1, wherein at least one of the annotations is selectively made visible during the web conference to certain participants in the web conference based on the expertise levels of the certain participants.

4. The system of claim 1, the executable operations further comprising:
determining, for each of the plurality of annotations, a respective location where to place the annotation in a virtual white board used to present the presentation presented in the web conference, wherein determining the respective location is based on the respective relevance parameter assigned to the annotation.

5. The system of claim 1, the executable operations further comprising:
identifying at least one annotation assigned a respective relevance parameter that exceeds a threshold value; and
responsive to identifying the at least one annotation assigned a respective relevance parameter that exceeds the threshold value, automatically persisting the identified annotation to the presentation.

6. The system of claim 1, the executable operations further comprising:
identifying at least one annotation assigned a respective relevance parameter that exceeds a threshold value; and
responsive to identifying the at least one annotation assigned a respective relevance parameter that exceeds the threshold value, automatically updating the presentation to include in the presentation content contained in the annotation.

7. A computer program product comprising a computer readable storage medium having program code stored thereon, the program code executable by a processor to perform a method comprising:
receiving, by the processor, a plurality of annotations for a presentation presented in a web conference;
assigning, by the processor, to each of the plurality of annotations a respective relevance parameter, wherein each relevance parameter indicates a relevance of a respective one of the plurality of annotations to a portion of the presentation to which the annotation pertains;

generating, by the processor, for each of the annotations, a decay model based on the respective relevance parameter, wherein the decay model indicates, based on respective expertise levels of participants participating in the web conference, a first duration of time the annotation is to be visible to at least a first participant participating in the web conference, and at least a second duration of time the annotation is to be visible to at least a second participant participating in the web conference, wherein the second duration of time is different than the first duration of time;

presenting, by the processor, each respective annotation with the presentation in accordance with the decay model generated for the respective annotation;

identifying at least one annotation assigned a respective relevance parameter that exceeds a threshold value; and responsive to identifying the at least one annotation assigned a respective relevance parameter that exceeds the threshold value, automatically generating a notification to a presenter of the presentation indicating to the presenter that the presenter should consider updating the presentation to include in the presentation content of the annotation assigned the respective relevance parameter that exceeds the threshold value.

8. The computer program product of claim 7, wherein the decay model for each annotation further controls availability of the annotation to users who are not participants in the web conference, but who view the web conference.

9. The computer program product of claim 7, wherein at least one of the annotations is selectively made visible during the web conference to certain participants in the web conference based on the expertise levels of the certain participants.

10. The computer program product of claim 7, the method further comprising:

determining, for each of the plurality of annotations, a respective location where to place the annotation in a virtual white board used to present the presentation presented in the web conference, wherein determining the respective location is based on the respective relevance parameter assigned to the annotation.

11. The computer program product of claim 7, the method further comprising:

identifying at least one annotation assigned a respective relevance parameter that exceeds a threshold value; and responsive to identifying the at least one annotation assigned a respective relevance parameter that exceeds the threshold value, automatically persisting the identified annotation to the presentation.

12. The computer program product of claim 7, the method further comprising:

identifying at least one annotation assigned a respective relevance parameter that exceeds a threshold value; and responsive to identifying the at least one annotation assigned a respective relevance parameter that exceeds the threshold value, automatically updating the presentation to include in the presentation content contained in the annotation.

\* \* \* \* \*